United States Patent
Lee et al.

(10) Patent No.: US 7,633,557 B2
(45) Date of Patent: Dec. 15, 2009

(54) METHOD AND DEVICE FOR ADAPTIVE COLOR CORRECTION

(75) Inventors: Wei-Kuo Lee, Zhubei (TW); Yi-Fan Chen, Taichung (TW)

(73) Assignee: MSTAR Semiconductor, Inc., Hsinchu County (TW)

( * ) Notice: Subject to any disclaimer, the term of this patent is extended or adjusted under 35 U.S.C. 154(b) by 511 days.

(21) Appl. No.: 11/217,501

(22) Filed: Sep. 2, 2005

(65) Prior Publication Data
US 2006/0050182 A1    Mar. 9, 2006

(30) Foreign Application Priority Data
Sep. 6, 2004    (TW) ............................... 93126820 A

(51) Int. Cl.
*G03F 3/08*    (2006.01)
(52) U.S. Cl. ...................... 348/624; 348/631; 348/645; 348/674; 348/679; 358/520; 386/14
(58) Field of Classification Search ................ 348/624, 348/631, 674; 386/44; 358/520
See application file for complete search history.

(56) References Cited

U.S. PATENT DOCUMENTS

| | | | | |
|---|---|---|---|---|
| 6,137,540 | A * | 10/2000 | Desprez-Le Goarant et al. . | 348/631 |
| 6,542,187 | B1 * | 4/2003 | Hamilton et al. ............ | 348/234 |
| 7,154,557 | B2 * | 12/2006 | Itoh et al. ................... | 348/453 |
| 7,193,659 | B2 * | 3/2007 | Huang et al. ................ | 348/649 |
| 7,405,771 | B2 * | 7/2008 | Lee et al. .................... | 348/645 |
| 7,453,524 | B2 * | 11/2008 | Lee et al. .................... | 348/679 |
| 2007/0041637 | A1 * | 2/2007 | Matsushima ................ | 382/169 |

FOREIGN PATENT DOCUMENTS

CN    1514652    7/2004

* cited by examiner

*Primary Examiner*—Brian P Yenke
(74) *Attorney, Agent, or Firm*—WPAT., P.C.; Justin King

(57) ABSTRACT

The present invention relates to a method and a device for adaptive color correction by weighting procedure according to the pixel luminance so as to adjust the pixel chrominance. The present invention prevents color noise occurring in the dark pictures. The method for adaptive color correction, comprises steps of: providing a luminance value of a pixel: determining a weighting value corresponding to said luminance value of said pixel, wherein said weighting value substantially increases when said luminance value increases; and adjusting chrominance of said pixel according to said weighting value.

6 Claims, 4 Drawing Sheets

METHOD AND DEVICE FOR ADAPTIVE COLOR CORRECTION

BACKGROUND OF THE INVENTION

1. Field of the Invention

The present invention generally relates to a method and a device for adaptive color correction and, more particularly, to a method and a device for adaptive color correction by weighting procedure according to the pixel luminance so as to adjust the pixel chrominance saturation.

2. Description of the Prior Art

With the arrival of the digital era, digital information products are replacing analog products. One example is that the digital TV gradually replaces the traditional analog TV. Meanwhile, the video information is recorded and distributed by digital media instead of traditional tapes. Consequently, the quality of digital images has become a major issue in the industry.

The digital image is recorded in pixels. The colors of each pixel associates with its brightness and chromaticity, are seen as various combinations of the so-called primary colors, red (R), green (G), and blue (B). Moreover, the quality of digital images primarily depends on the brightness, contrast, and chromaticity of the whole picture.

As for digital image processing, the prior art converts RGB signals into luminance (Y) and chroma (U and V) signals, and then adjusts these signals to correct the brightness, contrast, and chromaticity of digital images. Generally, a problem will occur while directly adjusting the luminance and chrominance signals of each pixel in a digital image.

Conventionally, the luminance (Y) and chrominance (U and V, or Cb and Cr) signals are handled individually. Therefore, the color saturation is adjusted independently of the luminance of each image pixel. Sometimes, color noise occurs in the dark pictures if video/image processing of a television is not properly performed.

Accordingly, there is need in providing a method and a device for adaptive color correction so as to effectively correct color on the digital image under low luminance.

SUMMARY OF THE INVENTION

It is a primary object of the present invention to provide a method and a device for adaptive color correction so as to adjust pixel chrominance according to the pixel luminance (Y) signal.

In order to achieve the foregoing object, the present invention provides a method for adaptive color correction, characterized in that chrominance of a pixel is adjusted according to corresponding luminance of the pixel by using a weighting procedure, wherein the weighting procedure comprises: providing a weighting function, wherein luminance of the pixel is a variable of the weighting function; determining a weighting value corresponding to luminance of the pixel using the weighting function; and adjusting chrominance of the pixel according to the weighting value.

It is preferable that the weighting function is related to a threshold luminance.

It is preferable that the weighting function is a linear function with boundary conditions.

It is preferable that the weighting function is expressed as $$W(Yin) = S \times (Yin - Yth) \text{ if } Yin > Yth$$

$$W(Yin) = 0 \text{ if } Yin <= Yth$$

where Yth denotes the threshold luminance, Yin denotes luminance of the pixel, and S denotes the slope of the linear function.

It is preferable that the adjusting step of the weighting procedure comprises steps of: adjusting chrominance of the pixel according to the weighting value if the weighting value does not exceed a weighting limit; and adjusting chrominance of the pixel according to the weighting limit if the weighting value exceeds the weighting limit.

The present invention further provides a device for adaptive color correction, comprising: a weighting decision device, receiving an input luminance signal so as to output a weighting signal; and a weighting device, receiving the weighting signal and at least one input chroma signal so as to output an output chroma signal.

It is preferable that the weighting decision device comprises: a subtractor, receiving the input luminance signal and a threshold luminance signal so as to output a difference value of the input luminance signal and the threshold luminance signal; and a multiplier, receiving the difference value of the input luminance signal and the threshold luminance signal and a slope signal so as to output the weighting signal.

It is preferable that the present invention further comprises a weighting limit device coupled to the weighting decision device, wherein the weighting limit device limits the weighting signal not to exceed a weighting level.

It is preferable that the weighting limit device is a clamper.

BRIEF DESCRIPTION OF THE DRAWINGS

The objects, spirits and advantages of the preferred embodiment of the present invention will be readily understood by the accompanying drawings and detailed descriptions.

DETAILED DESCRIPTION OF THE PREFERRED EMBODIMENT

The present invention providing a method and a device for adaptive color correction can be exemplified by the preferred embodiment as described hereinafter.

Figure 1:
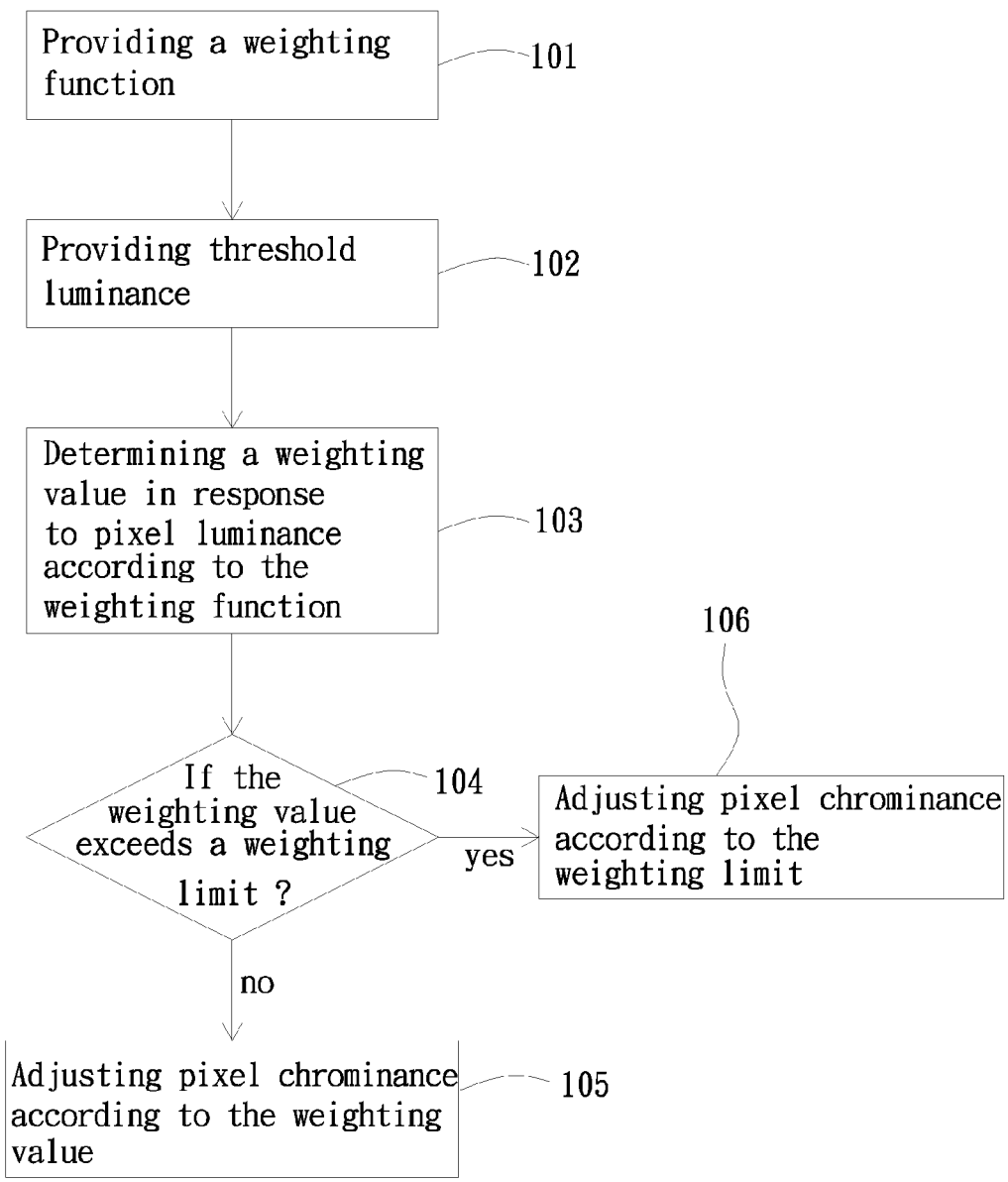
FIG. 1 is a flow chart showing a method for adaptive color correction in accordance with one preferred embodiment of the present invention.

In the present invention, the method for adaptive color correction is characterized in that chrominance of a pixel is adjusted according to corresponding luminance of the pixel by using a weighting procedure as described in FIG. 1. To begin with, a weighting function is provided as described in Step 101. The weighting function is related to a threshold luminance and the weighting function has luminance of the pixel as a variable. Preferably, the weighting function is a linear function with boundary conditions.

Step 101 is followed by Step 102, in which the threshold luminance is determined to be an initial value indicating that the weighting function has an output.

Therefore, in Step 103, a weighting value is determined corresponding to luminance of the pixel using the weighting function. The weighting function is expressed as $$W(Yin) = S \times (Yin - Yth) = A \text{ if } Yin > Yth$$

$$W(Yin) = 0 \text{ if } Yin <= Yth$$

where Yth denotes the threshold luminance, Yin denotes luminance of the pixel, S denotes the slope of the linear function, and A denotes the weighting value.

To avoid that the adjusted chrominance obtained from the weighting procedure exceeds the useful value, the weighting value is determined whether it exceeds a weighting limit, as described in Step 104. The weighting procedure proceeds with adjusting chrominance of the pixel according to the weighting value if the weighting value does not exceed the weighting limit (Step 105). Otherwise, chrominance of the pixel is adjusted according to the weighting limit (Step 106).

Figure 2:
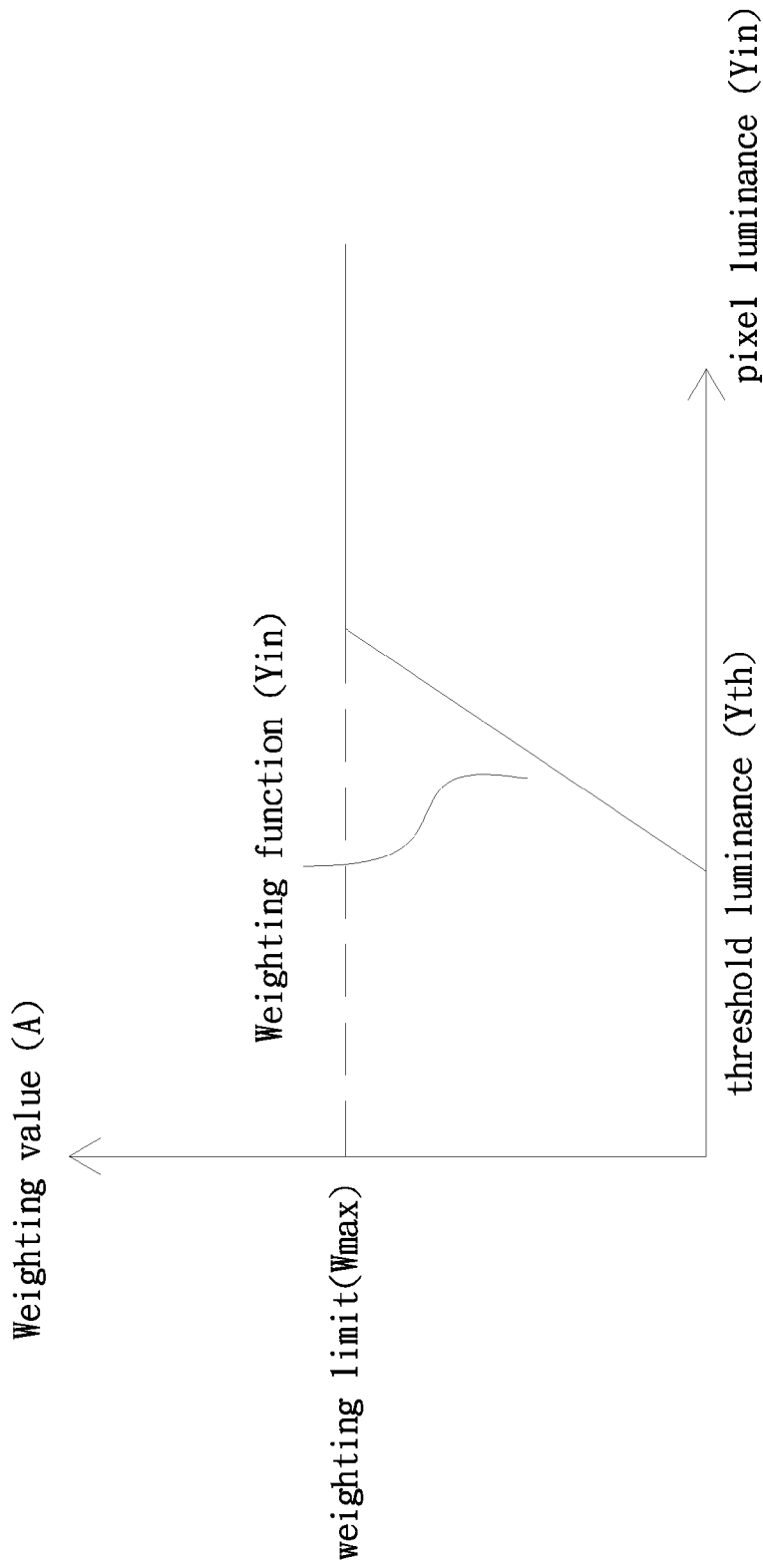
FIG. 2 is a graph showing a weighting function in accordance with the preferred embodiment of the present invention.

Please refer to FIG. 2, which is a graph showing a weighting function in accordance with the preferred embodiment of the present invention. In FIG. 2, the input pixel luminance Yin has to exceed the threshold luminance Yth such that the corresponding weighting value A exists according to the weighting function W(Yin). The weighting value A is limited by a weighting limit (Wmax) as the weighting value A reaches the weighting limit (Wmax).

Figure 3:
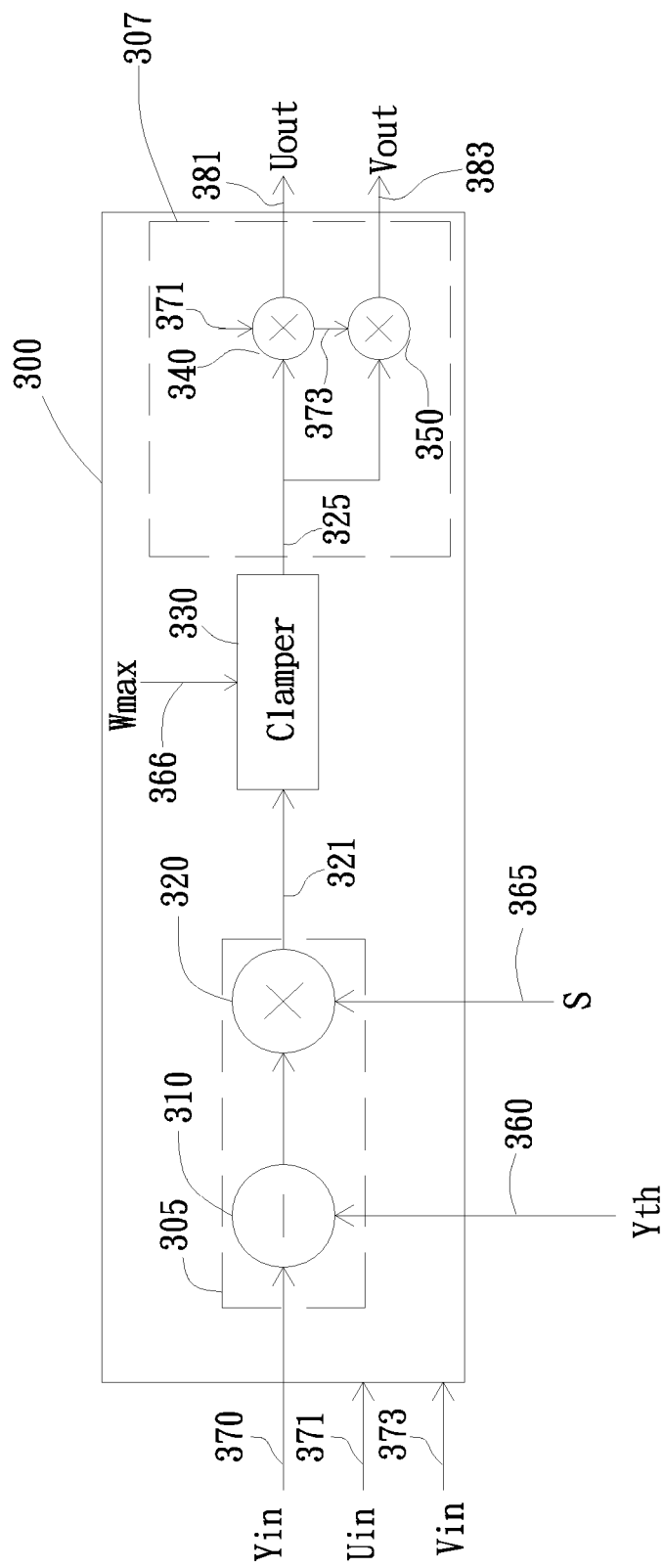
FIG. 3 is a schematic diagram showing a device for adaptive color correction in accordance with one preferred embodiment of the present invention.

Please refer to FIG. 3, which is a schematic diagram showing a device for adaptive color correction in accordance with one preferred embodiment of the present invention. The device 300 comprises: a weighting decision device 305, a weighting limit device 330, and a weighting device 307. The weighting decision device 305 receives an input luminance signal 370 so as to output a weighting signal 321. The weighting device 307 receives the weighting signal 321 and at least an input chroma signal (Uin) 371 and/or (Vin) 373 so as to output at least an output chroma signal (Uout) 381 and/or (Vout) 383.

It is preferable that the weighting decision device 305 comprises a subtractor 310 and a multiplier 320. The subtractor 310 receives the input luminance signal 370 and a threshold luminance signal (Yth) 360 so as to output a difference value of the input luminance signal 370 and the threshold luminance signal 360. The multiplier 320 receives the difference value of the input luminance signal 370 and the threshold luminance signal 360 and a slope signal (S) 365 so as to output the weighting signal 321.

The weighting limit device 330 receives the weighting signal 321 output from the weighting decision device 305 and a weighting limit signal 366 (Wmax) so as to limit an output level (Wmax) of the weighting signal 325 and outputs the weighting signal 325 to the weighting device 307. Preferably, the weighting limit device 330 is a clamper.

The weighting device 307 comprises two multipliers 340 and 350. The multiplier 340 receives the input chroma signal (Uin) 371 and the weighting signal 325 so as to output a output chroma signal (Uout) 381. The multiplier 350 receives the input chroma signal (Vin) 373 and the weighting signal 325 so as to output a output chroma signal (Vout) 383.

Therefore, the input chroma signal 371 and/or 373 of a digital image can be adjusted by the device 300 for adaptive color noise reduction according to the input luminance signal 370 so as to obtain adjusted the output chroma signal 381 and/or 383.

Figure 4:
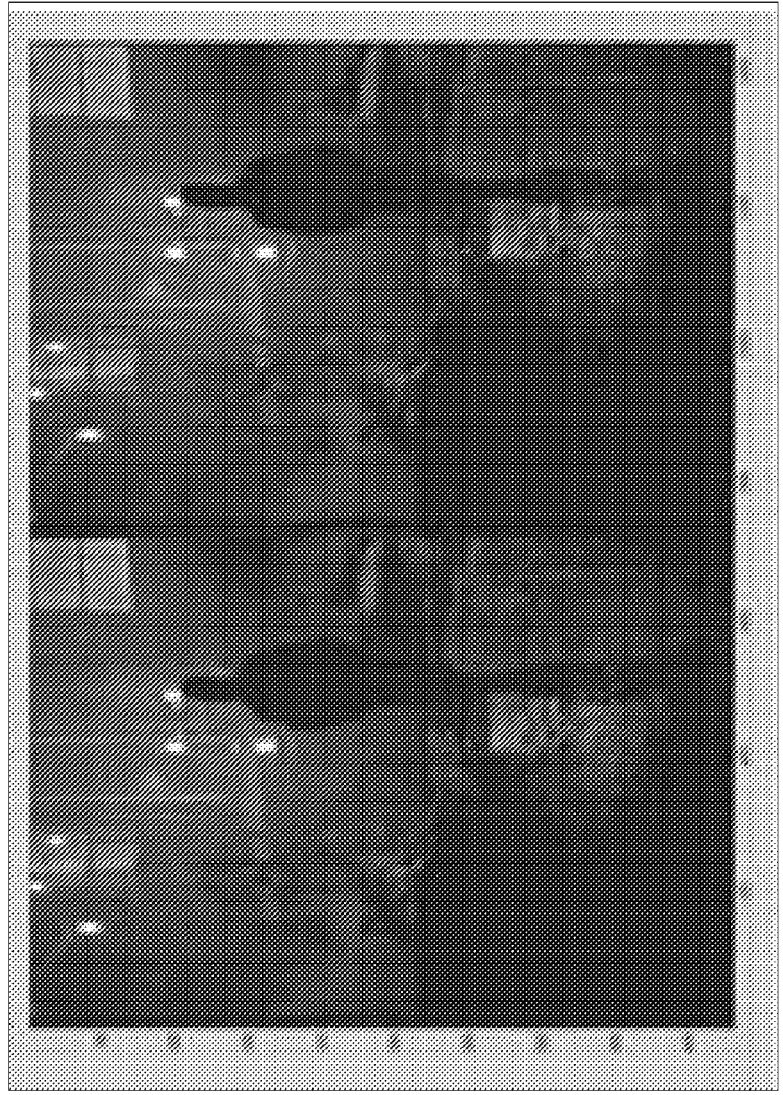
FIG. 4 shows comparison between digital images before and after being processed using the device for adaptive color correction in accordance with one preferred embodiment of the present invention.

Finally, FIG. 4 shows comparison between digital images before and after being processed using the device for adaptive color correction in accordance with one preferred embodiment of the present invention. The left portion is an original image before being processed using the device of the present invention while the right portion is an adjusted image after being processed. It is apparent that the present invention prevents color noise occurring in the dark pictures and corrects the color of the pictures.

According to the above description, the present invention discloses a method and a device for adaptive color noise reduction by weighting according to the pixel luminance so as to adjust the pixel chrominance. Therefore, the present invention has been examined to be novel, non-obvious and useful.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for adaptive color correction in a video display device, comprising steps of:
   providing a luminance value of a pixel;
   determining a weighting value corresponding to said luminance value of said pixel, wherein said weighting value substantially increases when said luminance value increases; and
   adjusting chrominance of said pixel according to said weighting value; wherein, said weighting value is determined according to a weighting function, which has a threshold luminance, and is a linear function with boundary condition, and is expressed as $W(Yin)=S \times (Yin-Yth)$, where Yth denotes a threshold luminance, Yin denotes luminance of said pixel, and S denotes a slope of said weighting function.

2. The method for adaptive color correction in a video display device as recited in claim 1, wherein said adjusting step further comprises:
   adjusting chrominance of said pixel according to said weighting value if said weighting value does not exceed a weighting limit; and
   adjusting chrominance of said pixel according to said weighting limit if said weighting value exceeds said weighting limit.

3. A device for adaptive color correction, comprising:
   a weighting decision device, receiving an input luminance signal so as to generate a weighting value accordingly, wherein said weighting value substantially increases when the value of said input luminance signal increases;
   an adjusting device, adjusting at least one input chroma signal according to said weighting value wherein said adjusting device has a multiplier; and
   said weighting decision device comprises
      a subtractor, receiving said input luminance signal and a threshold luminance signal so as to output a difference value of said input luminance signal and said threshold luminance signal; and
      a multiplier, receiving said difference value and a slope signal so as to output said weighting value.

4. The device for adaptive color correction as recited in claim 3, further comprising:
   a weighting limit device, coupled to said weighting decision device, wherein said weighting limit device limits said weighting signal not to exceed a weighting level.

5. The device for adaptive color correction as recited in claim 4, wherein said weighting limit device is a clamper.

6. The device for adaptive color correction as recited in claim 3, wherein said input chroma signal comprises:
   a first input chroma signal and a second input chroma signal.

\* \* \* \* \*